No. 797,251. PATENTED AUG. 15, 1905.
C. H. ATKINS.
STEERING, DRIVING, AND BRAKING DEVICE FOR WHEELS OF MOTOR VEHICLES.
APPLICATION FILED DEC. 19, 1904.
3 SHEETS—SHEET 1.
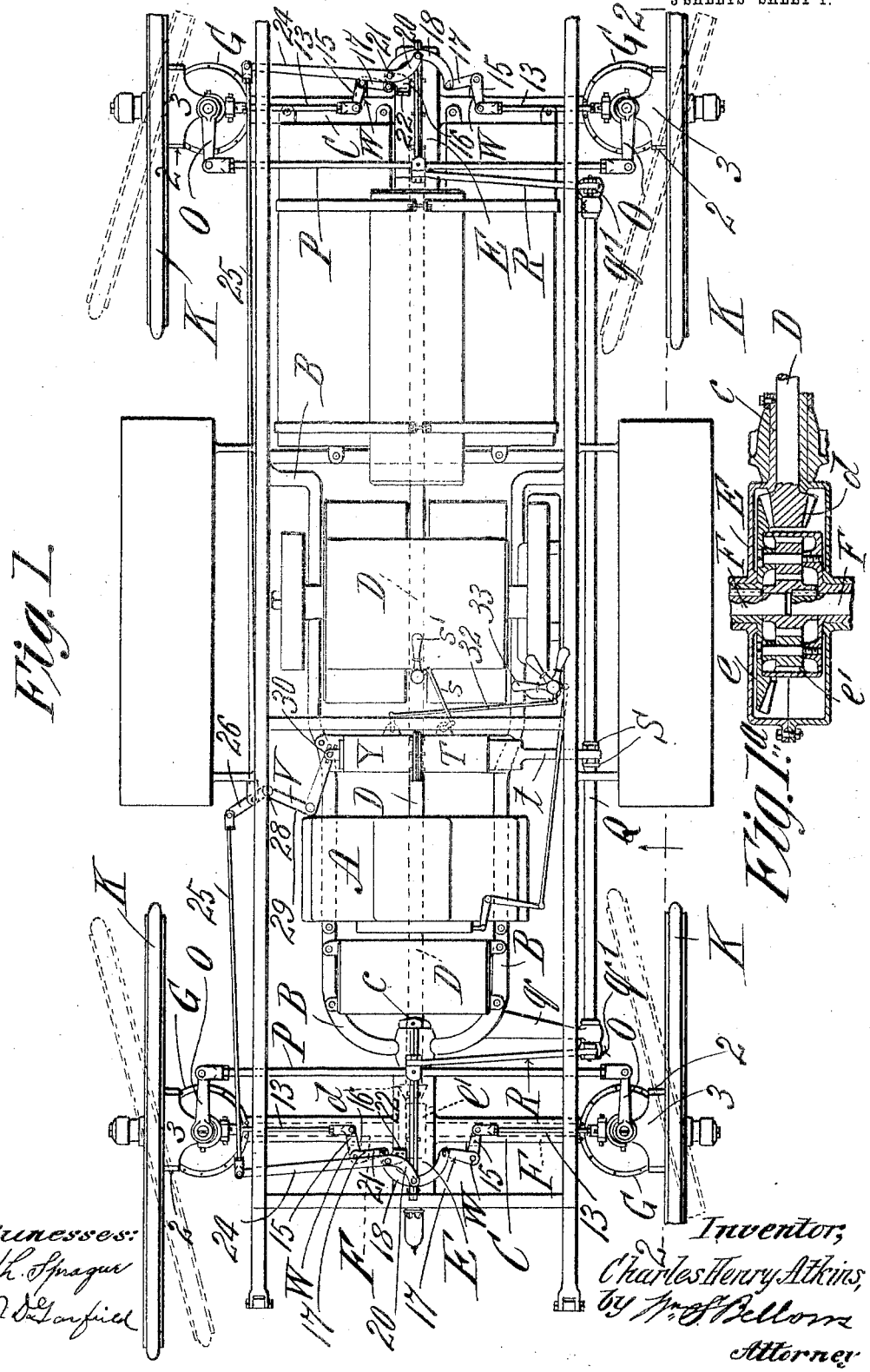
Witnesses:
H. H. Sprague
J. D. Garfield
Inventor:
Charles Henry Atkins,
by Jno. H. Bellows
Attorney

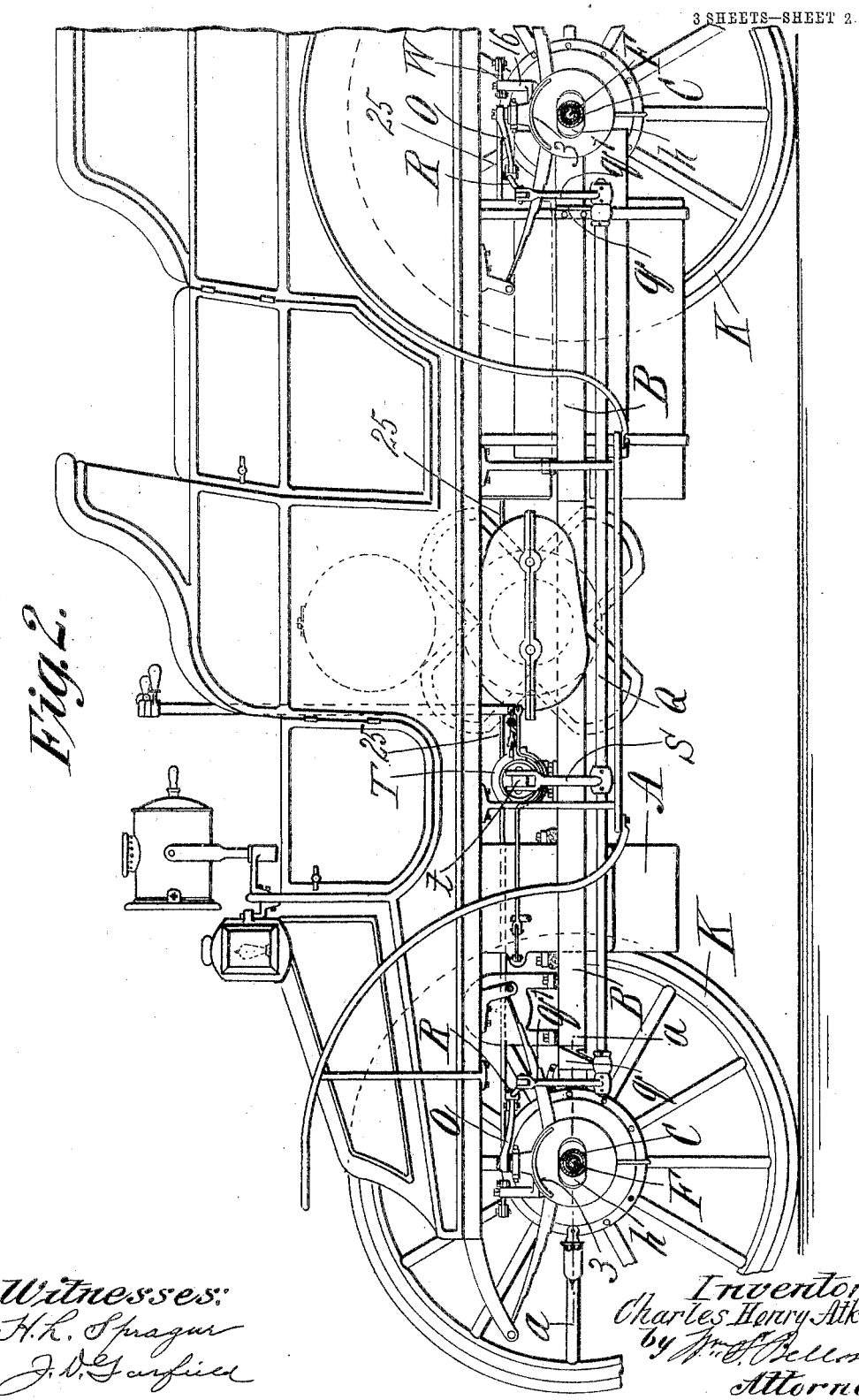

No. 797,251. PATENTED AUG. 15, 1905.
C. H. ATKINS.
STEERING, DRIVING, AND BRAKING DEVICE FOR WHEELS OF MOTOR VEHICLES.
APPLICATION FILED DEC. 19, 1904.
3 SHEETS—SHEET 3.
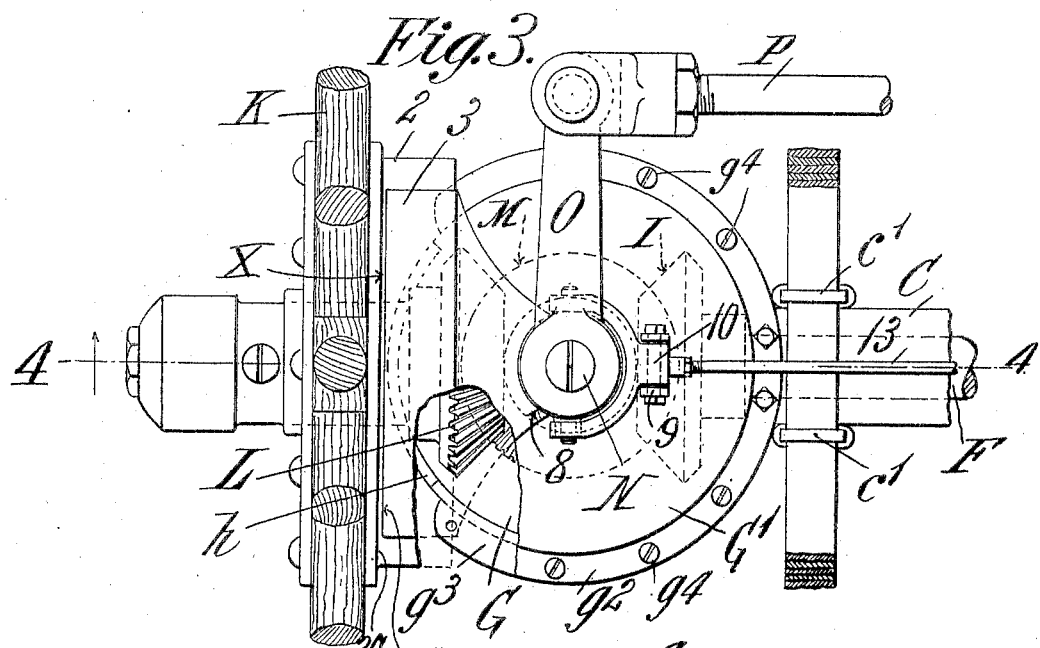
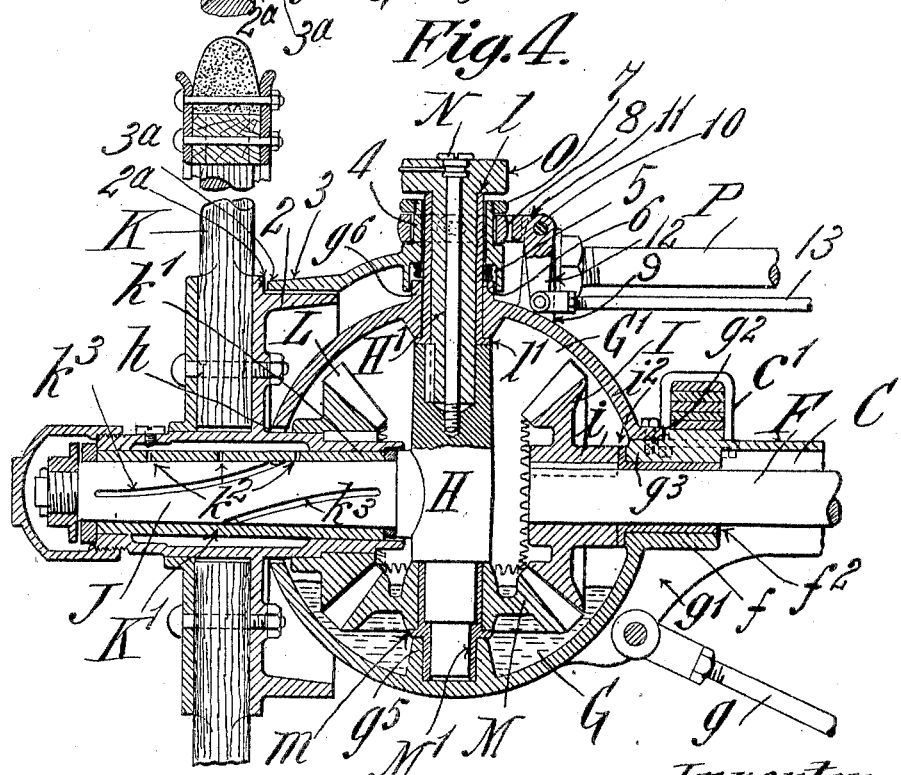
Witnesses:
H. L. Sprague
J. D. Garfield
Inventor,
Charles Henry Atkins,
by Wm. F. Bellows,
Attorney.

UNITED STATES PATENT OFFICE.

CHARLES HENRY ATKINS, OF SPRINGFIELD, MASSACHUSETTS.

STEERING, DRIVING, AND BRAKING DEVICE FOR WHEELS OF MOTOR-VEHICLES.

No. 797,251. Specification of Letters Patent. Patented Aug. 15, 1905.

Application filed December 19, 1904. Serial No. 237,542.

*To all whom it may concern:*

Be it known that I, CHARLES HENRY ATKINS, a citizen of the United States of America, and a resident of Springfield, in the county of Hampden and State of Massachusetts, have invented certain new and useful Improvements in Steering, Driving, and Braking Devices for Wheels of Motor-Vehicles, of which the following is a full, clear, and exact description.

This invention relates to improvements in motor-vehicles, and more particularly pertains to combined and interdependent devices comprised in means for transmitting the power to the individually-driven and individually-steered wheels and to means for positively steering all of the wheels simultaneously without affecting or being affected by the power-transmission mechanism; and as a provision consistent with the presence of the peculiarly-combined transmission and steering mechanism the invention, furthermore, includes brake-shoes and brake-operating devices combined and arranged in relation to the novel steering and transmission devices for advantageous and efficient coaction therewith.

The invention consists in the combination and arrangements of parts and the construction of certain of the parts, all substantially as hereinafter fully described, and set forth in the claims.

An automobile equipped with the present improved transmission, steering, and braking devices is illustrated in the accompanying drawings, in which—

Figure 1 is a plan view of a motor-vehicle embodying my invention. Fig. 1$^a$ is a sectional view through the compensating gearing on line $a\,a$, Fig. 2. Fig. 2 is a side elevation, partly in section, the plane of said section being indicated by line 2 2, Fig. 1. Fig. 3 is an enlarged plan view of one of the wheel driving and steering devices; and Fig. 4 is a section taken on line 4 4, Fig. 3.

Similar characters of reference indicate corresponding parts in all of the views.

In the drawings, A is a motor supported entirely on the U-shaped motor-supporting frame B, which has a three-point bearing on the axle-sleeves C at the rear end and on a stud $c$ on the compensating-gear case, which forms a part of said axle-sleeves at the forward end.

A chassis with the vehicle-body thereon is supported on four half-elliptic springs which are attached firmly by suitable clips C' (see Fig. 4) to the end portion of the axle-sleeve C.

The motor-shaft D extends forwardly and rearwardly from the motor A and is connected at either end to the bevel-pinions $d$ of the ordinary compensating gearing E, the bevel and internal gears $e\ e'$ of which are secured to the adjacent ends of the divided axles F, as shown in dotted lines in Fig. 1.

Firmly secured on the extreme outer ends of axle-sleeves C and having the lower parts thereof made integral therewith are the spherical casings G, which are strongly braced by truss-rods $g$ (a portion of one of such rods being shown in Fig. 4) and by the bracket-like extremities $g'$. At the point of connection of said axle-sleeve C with casing G a suitable bushing $f^2$ for the end of axle F, which projects therethrough, is provided. A removable top portion or hemispherical casing-section G' is secured by its flanged portion $g^2$ to a similar flange or rest $g^3$ on the main lower portion of the casing G by bolts $g^4$.

A centrally-located axially-vertical socket $g^5$ is formed in the lower portion of casing G, which is upwardly and inwardly open and constitutes the lower bearing for the vertical steering-post H, which post passes up through a suitable bearing in a hub $g^6$, formed on the top portion G' of said casing.

The side of the casing G opposite the end of axle-bearing $f$ is provided with a horizontally-elongated opening $h$, through which projects the axle-stud J, which is an integral right-angularly and outwardly-projecting part of the steering-post H and extends normally in line with and opposite the shaft-bearing $f$. This axle-stud J, on which is mounted the wheel K, is adapted to be swung horizontally on its pivoted steering-post H within suitable limits, as permitted by the elongated opening $h$, and a driving connection between the divided axle F and wheel K on the swinging axle-stud J is maintained through an arrangement of bevel-gears, to be now described, and the degree of swinging or turning movement imparted to the wheel-carrying axle-studs J is controlled by a steering-gear, to be later described, by which all of the four wheels of the vehicle are turned simultaneously. The bushing directly constituting the axle-bearing advantageously consists of a hardened flanged sleeve $f^2$, in which the axle F revolves. A bevel-gear I is keyed to the end of axle F and its hub $i$ has a thrust or wearing surface provided by the flange $i^2$ of sleeve $f^2$. (See Fig. 4.) The hub K' of wheel K, which is mounted on axle-stud J and which during the straight running of the vehicle is in alinement with axle F, has on an extended portion thereof and keyed thereto a bevel-gear L. This hub K' has a hardened sleeve $k'$ securely attached therein, and suitable lubricating-holes $k^2$ therethrough communicate with lubricant-retaining grooves $k^3$, formed on the axle-stud J. (See Fig. 4.) A nut and washer of common construction on the free end of axle-stud J serves to keep wheel K secure thereon.

Rotatably mounted on the lower portion of steering-post H and meshing with and transmitting driving power thereto is the intermediate bevel-gear M. This gear has a hardened bushing M' therein, a flange $m$ of which is interposed between the rim of the socket $g^5$ and the hub of the gear, and the inside of the bushing M' is counterbored to receive the shouldered portion of the post H, as shown in Fig. 4.

To facilitate the assembling of the parts inclosed in the casing G, the upper portion of the post H is continued in an extension H', which is securely keyed to post H and turns therewith, this post extension H' being surrounded by a lower end flanged bushing $l$, and its flange $l'$ is interposed between the top of post H and the lower edge of hub $g^6$ of the casing-section G', thus insuring a proper fitting of the post H in its bearings. A long screw N, passing down through post H', has a screw-threaded engagement in post H and serves to hold these two posts together when in use and affords a convenient means for taking the same apart and for assembling them, the pin $x$ engaging the annular groove in the screw, rendering more connection of the parts.

The upper end of the post extension H' of each wheel of the vehicle has formed thereon a lever O, (which will hereinafter be designated the "wheel-lever,") and these wheel-levers are set at right angles to the axles J of the wheels, the levers on the front-wheel steering-post extending rearwardly and those on the rear wheels extending toward the front of the vehicle, the construction of the front and rear wheel axle mechanism being substantially alike.

The driving of the four wheels of the vehicle, all at the same speed and with the same power, directly from the motor A by means of the constructions just described is through means as follows: The motor-shaft D connects at either end thereof with the small bevel-pinions $d$ of the usual compensating gears (such as commonly used on the rear axles of motor-vehicles) and drives thereby the larger bevel-gears $e$, which are secured to the adjacent ends of the divided axles F, whereby power is transmitted to each of the four wheels of the vehicle through the engagement of the bevel-gears I on the shaft F with the loose bevel-gears M on steering-posts H, which in turn drives the bevel-gears L on the wheel-hubs. The steering-posts H, on which bevel-gears M are mounted, being the turning-pivot of the wheels K, it is apparent that the transmission of power from the bevel-gear I to bevel-gear L is not affected or impaired by any turning of said wheels K relatively to the plane of rotation of axles F. The steering-levers O of the front and rear wheels of the vehicle, respectively, are connected by the bars P, whereby said pairs of wheels are made to move in unison, as shown in dotted-line position in Fig. 1. A rock-shaft Q is supported on and to one side of the motor-frame B in suitable bracket-bearings $q'$, and from the upper or free ends of said levers $q$ connecting-rods R extend to engagement centrally of the steering-lever bars P. (See Fig. 1.) A vertical lever S, Fig. 2, secured to the rock-shaft Q nearly midway of its length, has engagement with the piston $t$ of a horizontally-supported fluid-pressure or other motor T, which by means of a suitable valve connection $s$ with a hand-lever S' is caused to operate quickly and with ample power to simultaneously operate the front and rear wheel steering mechanism to turn the front and rear wheels in opposite directions, respectively, thereby causing the moving vehicle to make a correspondingly shorter turn than would be the case were the front wheels only turned and to also cause the rear wheels of the vehicle to "track" with the front wheels, which under some conditions is of great advantage, especially in mud or snow.

The presence in the motor-vehicle of the novel means for both turning the front and rear wheels in steering and for applying the motive power simultaneously to all four wheels has rendered it necessary to provide specially constructed and arranged, as well as efficient and sufficiently powerful, wheel-brakes, preferably on all four wheels, and means especially adapted for operating the same quickly and powerfully, if necessary, consistent with the above provisions and conditions.

Referring to Figs. 3 and 4 of the drawings, an annular projecting flange 2 is formed on each wheel-hub, its periphery being of sufficient width to form a suitable brake-surface, against which bears or may bear a brake-shoe 3, which is in the form of a segment of a band or ring, having the inner surface thereof of the same arc or curve as the surface of flange 2. An extended flange portion of this brake-shoe has formed thereon a centrally-located vertical sleeve 4, which has a sliding fit around the bushed portion $l$ of steering-post H'. The lower end portion of said sleeve 4 has an internally-recessed portion 5 of an enlarged diameter sufficient to closely fit over the hub $g^6$ on casing G', and a spiral spring 6, resting on top of hub $g^6$, presses upwardly on the shouldered top of the recessed portion, thereby keeping the entire brake-shoe lifted normally from engagement with the brake-flange 2.

The portion of sleeve 4 above the junction of the brake-shoe flange therewith is of somewhat reduced diameter externally and is provided with a nut 7 on its upper end, between which and the shouldered lower end of said reduced portion of the sleeve 4 a collar 8 is loosely maintained. Supported on an upright post 9, adjacent sleeve 4 on casing G', is an angular lever 10, whose horizontal forked end 11 engages loose collar 8, and from the depending member 12 of said lever 10 a horizontal connecting-rod 13 extends above and parallel with axle-sleeve C and nearly to the center thereof.

It will be apparent from the foregoing description of the vertically-movable brake-shoe 3 as located above the surface of wheel-flange 2 that the said shoe must turn with the wheel-flange in order that it may always be preserved in proper relation thereto, and to provide for this turning movement of the brake-shoe, in addition to its vertical movement, a shoulder $2^a$ is provided on flange 2, against which the adjacent edge portion of brake-shoe 3 engages and is guided thereby.

The above-described parts constituting the wheel-brake constructions are provided on each of the four wheels of the vehicle and are made to operate simultaneously and equally thereon by a system of equalized brake connections, to be now described.

The opposite ends (from those just described) of the connecting-rods 13 extend from each individual wheel-brake lever O of each pair of wheels, front and rear, and are each connected to an arm 15 of angular levers W, which are supported on brackets 16 on axle-sleeves C, the other arms 17 of these angular levers being united by a curved equalizing-yoke 18, whereby a movement of said yoke longitudinally of the vehicle is transmitted at right angles to the steering-levers O of each wheel of a pair. And that the movement of the equalizing-yokes 18 of each pair of wheels to turn the vehicle either to the right or left be in a direction to and from each other, as will be seen by a reference to Fig. 1 of the drawings, each yoke 18 being connected by one end to the curved extremity of a long lever 20, which is pivoted at 21 on an upright support 22, secured to the transmission-gear case E, the long arm 24 of said lever reaching beyond one side of the vehicle-frame. Extending alongside of said frame and normally parallel therewith are two connecting-rods 25, which by one end are connected to the levers 24 and by the other and adjacent ends to short equalizing-levers 26, as shown clearly in Fig. 1. This equalizing-lever 26 is in turn pivotally attached to one arm 27 of an angular lever V, which is pivotally connected at 28 to a bracket on the motor-frame B. The other arm 29 of said lever V is engaged by the piston 30 of a fluid-pressure or other motor Y, whereby through suitable valve connections 32 with a steering-handle 33 (see Fig. 1) a quickly-responsive and powerful control of the vehicle is obtained.

For uniformity and brevity of expression the parts C C have been hereinabove referred to as "axle-sleeves," as they may advantageously be of sleeve form and are employed in the place and manner common for axle-sleeves, and such term having acquired a generic status in this art it is to be understood that these parts need not necessarily be of actual sleeve or tubular form, for, in fact, as I have designed the structure they are made of but partial sleeve form—that is, in the shape of channel-bars, arranged with the channel sides downwardly open and inclosing the sections of the divided axles at their tops and sides.

Having thus described my invention, what I claim, and desire to secure by Letters Patent, is—

1. In a mechanism of the character described, in combination an axle, and a separate axle-stud normally in line with, and beyond each end of, the axle, and each stud having a post perpendicular to its length, the vehicle-wheels mounted for rotation on the axle-studs, and having bevel-gears on the outer ends of the axle, bevel-gears mounted for rotation on the axle-stud posts, and in mesh with both the vehicle-wheel gears, and the axle-gears, supporting members arranged along and adjacent the axle and having at the end portions thereof casings inclosing said gears, and constituting journal-bearings and supports for the latter, means for imparting driving rotation to the axle, means connected with the axle-posts for imparting partial rotary movements thereto, and a sleeve slidable on each posts having a brake-shoe extension coöperating with the brake-flanges of the wheel, and means for imparting back-and-forth sliding movements to said sleeves on the posts.

2. In a mechanism of the character described, the combination with an axle, and a separate axle-stud normally in line with, and beyond each end of, the axle, and each stud having a post perpendicular to its length, and extending above and below its central line, the vehicle-wheels mounted for rotation on the axle-studs, and having bevel-gears at the inner ends of their hub portions, bevel-gears on the outer ends of the axle, bevel-gears mounted for rotation on the lower extensions of the axle-stud posts, and in mesh with both the vehicle-wheel gears, and the axle-gears, supporting members arranged along and adjacent to the axle and having at the end portions thereof sectionally-formed casings inclosing said gears, and axle-posts and made with a bottom socket in which the lower portion of the axle-post is seated and with an upper opening through which the upper portion of the post protrudes and levers secured in the upper post extremities above said casings, and operating connections provided thereto.

3. In a mechanism of the character described, the combination with an axle, and a separate axle-stud normally in line with, and beyond each end of, the axle, and each stud having a post perpendicular to its length, and extending thereabove and therebelow, the vehicle-wheels mounted for rotation on the axle-studs, and having bevel-gears at the inner ends of their hub portions, bevel-gears on the outer ends of the axle, bevel-gears mounted for rotation on the axle-stud posts, and in mesh with both the vehicle-wheel gears, and the axle-gears, supporting members arranged along and adjacent to the axle and having at the end portions thereof casings inclosing said gears, and axle-posts and constituting supports and journal-bearing for the latter, means for imparting driving rotation to the axle, levers provided on the axle-stud posts, a transversely-arranged rod connecting both levers, a longitudinally-ranging rock-shaft having levers, one in connection with said transverse rod, and a motor having a connection with the other of said levers.

4. In a mechanism of the character described, in combination, an axle, and a separate axle-stud normally in line with, and beyond each end of, the axle, and each stud having a post perpendicular to its length, and extending above and below its axial line, the vehicle-wheels mounted for rotation on the axle-studs, and having bevel-gears at the inner ends of their hub portions, and having brake-flanges, bevel-gears on the outer ends of the axle, bevel-gears mounted for rotation on the lever portions of the axle-stud posts, and in mesh with both the vehicle-wheel gears, and the axle-gears, supporting members arranged along and adjacent to the axle and having at the end portions thereof casings inclosing said gears and axle-posts and constituting supports and journal-bearings for the latter, means for imparting driving rotation to the axle, sleeves movable up and down on the upper extremities of the axle-stud posts, having annular grooves, and brake-shoe extensions, angle-levers pivotally mounted on the casings, one arm of each being of yoke shape and engaging in the grooves in said sleeves, and means for imparting swinging movements to said pivotally-mounted yoke-membered levers.

5. In a mechanism of the character described, in combination, an axle, and a separate axle-stud normally in line with, and beyond each end of, the axle, and each stud having a post perpendicular to its length and extending above and below its axial line, the vehicle-wheels mounted for rotation on the axle-studs, and having bevel-gears at the inner ends of their hub portions, and also having brake-flanges, bevel-gears on the outer ends of the axle, bevel-gears mounted for rotation on the lever portions of the axle-stud posts, and in mesh with both the vehicle-wheel gears, and the axle-gears, supporting members arranged along and adjacent to the axle and having at the end portions thereof casings inclosing said gears and axle-posts and constituting supports, and journal-bearings for the latter, means for imparting driving rotation to the axle, sleeves movable up and down on the upper extremities of the axle-stud posts, having annular grooves, and brake-shoe extensions, angle-levers pivotally mounted on the casings, one arm of each being of yoke shape and engaging in the grooves in said sleeves, rods connected to said yoke-lever, an equalizing-yoke, angle-levers connecting said equalizing-yoke, and the yoke-levers, a lever coacting with the equalizing-yoke, a motor, and connections between same and the equalizing-yoke levers, for the purposes set forth.

6. In a mechanism of the character described, the combination with an axle, and a separate axle-stud normally in line with, and beyond each of, the axles, and each stud having a post perpendicular to and crossing its length, the vehicle-wheels mounted for rotation on the axle-studs, and having bevel-gears at the inner ends of their hub portions, bevel-gears on the outer ends of the axle, bevel-gears mounted for rotation on the axle-stud posts, and in mesh with both the vehicle-wheel gears, and the axle-gears, supporting members arranged along and adjacent to the axle and having at the end portions thereof sectionally-formed spherical casings inclosing said gears and axle-posts and each lower section having a socket at its bottom, an externally-flanged journal-stepped bushing M' in said socket and receiving therein the lower extremity of the post, and means for driving the axle.

7. In a mechanism of the character described, in combination, front and rear axles and separate axle-studs normally in line with, and beyond each end of, the axles, and each stud having a post perpendicular to its length, and extending above and below its axial line, the vehicle-wheels mounted for rotation on the axle-studs, and having bevel-gears at the inner ends of their hub portions, and having brake-flanges, bevel-gears on the outer ends of the axle, bevel-gears mounted for rotation on the lower portions of the axle-stud posts, and each in mesh with both a vehicle-wheel gear and an axle-gear, supporting members arranged along and adjacent to the axle and having at the end portions thereof casings inclosing said gears and axle-posts and constituting supports and journal-bearings for the latter, means for imparting driving rotation to the axle, sleeves movable up and down on the upper extremities of the axle-stud posts, having annular grooves, and brake-shoe extensions, angle-levers 11, 12, pivotally mounted on the casings, one arm of each being of yoke shape and engaging in the grooves in said sleeves, a motor, having a piston-rod, the angle-lever $v$ connected with the piston-rod, the equalizing-lever 26 connected with the lever $v$, the equalizing-yokes 18, 18, the levers 24, 24, pivotally mounted and connected intermediately with the equalizing-yokes, the two rods 25, 25, connecting the lever 26 with both levers 24, 24, and the four rods 13 having connection with the angle-levers 11, 12 and with the extremities of the equalizing-yokes 18, 18, for the purposes set forth.

8. In a mechanism of the character described, the combination with the axle sleeve or bar C having at its outer extremity the section-casing G, formed at its bottom with a journal-bearing socket, at its top with an opening and at its outer side with a horizontally-elongated aperture, of the axle having at its outer end within said casing the bevel gear-wheel L, the axle-stud made with the post H having its lower portion seated in said socket and its upper portion made with the detachable extension H' having the lever extension O, and the axially-penetrating uniting-screw N, and the gear-wheel M rotatable about the lower portion of the axle-stud post and meshing into the gear-wheels I and L.

9. In a mechanism of the character described, the combination with the axle sleeve or bar C having at its outer extremity the section-casing G, formed at its bottom with a journal-bearing socket, at its top with an opening and at its outer side with a horizontally-elongated aperture, of the axle having at its outer end within said casing, the bevel gear-wheel I, the wheel-hub having the bevel gear-wheel L, the axle-stud made with the post H having its lower portion seated in said socket and its upper portion extending through the upper opening in the casing and having the lever extension O, the gear-wheel M rotatable about the lower portion of the axle-stud post and meshing into the gear-wheels I and L, the sleeve 4 encircling and vertically movable about the upper axle-stud-post extension and carrying the brake-shoe, a spring between the casing-top and the under portion of the sleeve, and a lever operable to downwardly force the brake-shoe sleeve.

10. In a mechanism of the character described, the combination with the axle sleeve or bar C having at its outer extremity the sectionally-formed casing G provided at its bottom with a journal-bearing socket, at its top with an opening and at its outer side with a horizontally-elongated aperture, of the axle having at its outer end within said casing, the bevel gear-wheel I, the wheel having at its inner side adjacent its hub, the flat surface X, the brake-flange inwardly projecting from said surface, and having its hub inwardly projecting within the casing and provided with the bevel gear-wheels L, the gear-wheel M rotatable about the lower portion of the axle-stud post and meshing into the gear-wheels I and L, the sleeve 4, movable vertically about the upper extension of the axle-stud post and having the brake-shoe projecting toward the inner face of the wheel adjacent the brake-flange and with its edge engaging the surface X, and a lever for downwardly moving the sleeve.

11. In a mechanism of the character described, the combination with the axle sleeve or bar C having at its outer extremity the sectional casing G, formed at its bottom with a journal-bearing socket, at its top with an opening and at its outer side with a horizontally-elongated aperture, of the axle having at its outer end within said casing, the bevel gear-wheel I, the wheel-hub having the brake-flange and the bevel gear-wheel L, the axle-stud made with the post H having its lower portion seated in said socket and its upper portion made with the detachably-united extension H' provided with the lever O, the gear-wheel M rotatable about the lower portion of the axle-stud post and meshing into the gear-wheels I and L, the sleeve 4 embracing the axle-stud post above the casing, having the brake-sleeve extension, the under recess 5, and having its upper end portion screw-threaded, the yoke-ended pivotally-mounted angle-lever embracing the sleeve, and the nut 7 engaging the upper threaded portion of the sleeve above the angle-lever yoke.

Signed by me at Springfield, Massachusetts, in presence of two subscribing witnesses.

CHARLES HENRY ATKINS.

Witnesses:
 CAMPBELL CHAPIN,
 WM. S. BELLOWS.